(12) United States Patent
Suzuki

(10) Patent No.: US 7,508,833 B2
(45) Date of Patent: Mar. 24, 2009

(54) WIRELESS COMMUNICATION APPARATUS AND BASE STATION DETECTION METHOD

(75) Inventor: Masami Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 521 days.

(21) Appl. No.: 11/091,931

(22) Filed: Mar. 29, 2005

(65) Prior Publication Data

US 2005/0232312 A1 Oct. 20, 2005

(30) Foreign Application Priority Data

Mar. 30, 2004 (JP) .............................. 2004-099176

(51) Int. Cl.
*H04L 12/56* (2006.01)
(52) U.S. Cl. ...................................... 370/401
(58) Field of Classification Search ............ 438/5, 438/7, 10–11, 16–18, 22–24, 29, 31, 34–36, 438/128–130, 149, 484, 538
See application file for complete search history.

(56) References Cited

U.S. PATENT DOCUMENTS

2002/0057702 A1* 5/2002 Mizukoshi .................. 370/401
2003/0099224 A1* 5/2003 Oates .......................... 370/342
2004/0029558 A1* 2/2004 Liu .......................... 455/404.2
2005/0113978 A1* 5/2005 Sharma et al. ............... 700/259

FOREIGN PATENT DOCUMENTS

JP 2002-330142 11/2002

* cited by examiner

*Primary Examiner*—Walter L Lindsay, Jr.
*Assistant Examiner*—Andre' C Stevenson
(74) *Attorney, Agent, or Firm*—Nixon & Vanderhye, PC

(57) ABSTRACT

An example wireless communication apparatus stores ANY scan responsive flags to indicate whether or not each access point to be an object of access is an access point set to be responsive to an ANY scan. Upon detecting the access point, the access point detection in an ANY scan mode is firstly performed, and then the access point detection in a special scan mode is performed only for access points which are not detected by the ANY scan and are non-responsive to the ANY scan.

20 Claims, 6 Drawing Sheets (a)

(b)

(c)

WIRELESS COMMUNICATION APPARATUS AND BASE STATION DETECTION METHOD

BACKGROUND OF THE INVENTION

1. Field of the Invention

The present invention relates to a wireless communication apparatus capable of establishing a wireless communication with a base station in conformity to a predetermined standard such as a wireless LAN (Local Area Network) system. The present invention further relates to a base station detection method for detecting a base station with such a wireless communication apparatus.

2. Description of the Related Art

A type of wireless communication apparatuses as mentioned above includes, for example, a wireless communication apparatus as disclosed in Japanese Patent Application Laid-Open No. 2002-330142 (hereinafter referred to as a "conventional wireless communication apparatus"). This conventional wireless communication apparatus has a communication mode involving an intervention of an access point for a wireless communication network and another communication mode for a direct communication with a client device. In order to establish a connection with the wireless communication network, firstly a judgement device judges whether or not any access point exists. If there is no access point, the communication can be established with the wireless communication network through the direct communication with the client device.

On the other hand, there are many suppliers for presenting a service allowing an access to a wide area network in such a manner that a user makes an access based on a wireless LAN system to an access point which may be connected to the wide area network via a wired communication for example. In order to make an access to such a wide area network on the basis of a contract with a supplier, one or more access points prepared by the supplier must be detected. For this, the conventional wireless communication apparatus sends a detection signal to detect one or more special access points, so that access points existing around the apparatus can be detected on the basis of each response signal of the detection signal.

However, the conventional wireless communication apparatus as mentioned above has the following problems.

That is, in order to detect access points with the aid of detection signals as mentioned above, the detection process must be repeated as many as the number of suppliers that the user contracted with, so that a processing time becomes enormous. On the other hand, it would be possible to simultaneously detect access points existing around the apparatus by means of a common detection signal regardless of suppliers, which is prescribed by a wireless LAN standard. However, for the security, some access points do not inform their existence in response to such a common detection signal, which may cause a fault in the detection. Consequently, in order to detect access points without such a fault in the detection, the detection process is to be performed individually for each of the access points specified. For this reason, from a technical point of view, it is substantially impossible to perform the detection process as quickly as practical.

SUMMARY OF THE INVENTION

The present invention has been accomplished in view of the above problems for example. It is therefore an object of the present invention to provide a wireless communication apparatus capable of efficiently detecting accessible base station or stations, and provide a method for detecting such base station or stations.

The above object of the present invention can be achieved by a wireless communication apparatus capable of establishing a wireless communication conformed to a predetermined standard with a base station or stations conformed to the predetermined standard via a wireless communication device, the apparatus provided with: a memory device for storing identification information individually assigned to each of the base station or stations in conformity to the predetermined standard, in association with each of the base station or stations to be an object of access; and a base station detection device having a first detection mode capable of sending via the wireless communication device a first detection signal, whose object of detection is all base stations conformed to the predetermined standard, without specifying the identification information, and capable of detecting the base station or stations existing within a communication area of the wireless communication device to be the object of access, on the basis of a response signal, which is transmitted in response to the first detection signal from each of the base station or stations set to be responsive to the first detection signal among the all base stations and includes the identification information, wherein the memory device further stores, in association with the identification information, reference information to indicate whether or not each of the base station or stations to be the object of access is a base station set to be responsive to the first detection signal.

According to the present invention, upon detecting the base station or stations in the first detection mode, the first detection signal, whose object of detection is all base stations conformed to the predetermined standard, without specifying the identification information is transmitted via the wireless communication device. Then, in response to this transmitted first detection signal, the response signal, which is transmitted from each of the base station or stations set in advance to be responsive to the first detection signal, is received via the wireless communication device. In this response signal, the identification information is included which is individually assigned to each of the base station or stations. Therefore, by referring to this response signal including the identification information and another identification information stored in the memory device to be the object of access, it becomes possible to detect whether or not there exist the base station or stations to be the object of access within the communication area of the wireless communication device. Furthermore, since the first detection signal is common to the base stations conformed to the predetermined standard, performing only once the base station detection in the first detection mode makes it basically possible to simultaneously detect the base stations existing within the communication area.

In particular, the memory device stores not only the identification information, as for the base station or stations to be the object of access, but also the reference information to indicate whether or not each of the base station or stations is a base station set to be responsive to the first detection signal, in association with the identification information. Therefore, even in the case that the base station or stations to be the object of access are not detected as a result of the execution of the base station detection process in the first detection mode, it is possible to clearly identify whether such a result is caused by a fact that the base station or stations are out of the communication area of the wireless communication device, or is caused by a fact that the base station or stations are preset to be irresponsive to the first detection signal for the security. Therefore, it is possible to perform the base station detection efficiently without fault.

In an aspect of the present invention, the wireless communication apparatus is provided with the wireless communication device.

In this aspect, since the wireless communication apparatus includes the wireless communication device, it is possible to install the wireless communication apparatus efficiently.

In another aspect of the present invention, the base station detection device further has a second detection mode capable of receiving an inform signal including the identification information, which is sent from each of the base station or stations conformed to the predetermined standard with a predetermined time interval, via the wireless communication device and capable of detecting the base station or stations existing within the communication area of the wireless communication device to be the object of access, on the basis of the received inform signal.

According to this aspect, upon detecting the base station or stations in the second detection mode, the inform signal, which includes the identification information and is transmitted from each of the base station or stations with the predetermined time interval, is received via the wireless communication device. The first detection mode and the second detection mode are different from each other in a point that it is an active detection (in case of the first detection mode) or a passive detection (in case of the second detection mode). The active detection is to detect the base station or stations actively by sending a detection signal from the wireless communication apparatus via the wireless communication device. The passive detection is to detect the base station or stations passively by receiving via the wireless communication device the inform signal transmitted from each of the base station or stations with the predetermined time interval. However, the responsive base stations are the same between these two modes. For this reason, it is possible to utilize the aforementioned reference information also to the detection result in the second detection mode. Therefore, it is possible to perform the base station detection efficiently.

Incidentally, the base station detection device may have only the second detection mode, without having the first detection mode.

In another aspect of the present invention, the base station detection device further has a third detection mode capable of sending a second detection signal, whose object of detection is a specific base station or stations among the all base stations by specifying the identification information, via the wireless communication device and capable of detecting whether or not the specific base station or stations exist within the communication area of the wireless communication device, on the basis of the response signal, which is transmitted in response to the second detection signal from each of the specific base station or stations.

According to this aspect, upon detecting the base station or stations in the third detection mode, the second detection signal to detect the specific base station or stations is transmitted via the wireless communication device, and the specific base station or stations are detected, on the basis of the response signal, which is transmitted in response to this second detection signal from each of the specific base station or stations. For example, combining the third detection mode with the first or second detection mode makes it possible to perform the base station detection efficiently without default.

In another aspect of the present invention, the memory device stores the reference information such that the reference information can be updated.

According to this aspect, since the reference information can be updated, it is possible to set the reference information appropriately depending on the situation. Therefore, it is possible to perform the base station detection efficiently.

In another aspect of the present invention, the wireless communication apparatus is further provided with a reference information update device for updating the reference information stored in the memory device, on the basis of at least one of detection results of the first detection mode and the second detection mode.

According to this aspect, the reference information update device makes it possible to update the reference information, on the basis of the detection result in the first or second detection mode. Therefore, it is possible to perform the base station detection efficiently.

In another aspect of the present invention, the base station detection device further has the above described second detection mode, and the base station detection device performs the first or second detection mode, and the third detection mode for a batch of base station detection, the third detection mode being for specifying at least a part of the base stations set to be irresponsive to the first detection signal from among the base station or stations to be the object of access.

According to this aspect, for a batch of base station detection, the first or second detection mode, and the third detection mode for specifying at least a part of base stations set to be irresponsive to the first detection signal are performed. Performing the base station detection in this manner makes it possible to reduce the time required for a batch of base station detection.

In another aspect of the present invention, the base station detection device further has the above described second detection mode, and the base station detection device selectively performs either one of the first detection mode, the second detection mode and the third detection mode for a batch of base station detection, the third detection mode being for specifying at least a part of the base stations set to be irresponsive to the first detection signal from among the base station or stations to be the object of access.

According to this aspect, for a batch of base station detection, the first detection mode, the second detection mode or the third detection mode in which at least a part of the base stations set to be irresponsive to the first detection signal is specified, is performed. Performing the base station detection in this manner makes it possible to reduce the time required for a batch of base station detection.

The above object of the present invention can be achieved by a base station detection method on a wireless communication apparatus capable of establishing a wireless communication conformed to a predetermined standard with a base station or stations conformed to the predetermined standard via a wireless communication device, the method provided with: a memory process of storing identification information individually assigned to each of the base station or stations in conformity to the predetermined standard, in association with each of the base station or stations to be an object of access; and a base station detection process having a first detection mode capable of sending via the wireless communication device a first detection signal, whose object of detection is all base stations conformed to the predetermined standard, without specifying the identification information, and capable of detecting the base station or stations existing within a communication area of the wireless communication device to be the object of access, on the basis of a response signal, which is transmitted in response to the first detection signal from each of the base station or stations set to be responsive to the first detection signal among the all base stations and includes the identification information, wherein the memory process includes a process of storing, in association with the identification information, reference information to indicate whether or not each of the base station or stations to be the object of access is a base station set to be responsive to the first detection signal.

According to the base station detection method, since the reference information to indicate whether or not each of the base station or stations to be the object of access is a base station set to be responsive to the first detection signal, which is transmitted in the process of performing the first detection mode, is stored, the efficient detection can be achieved.

In an aspect of the present invention, the base station detection method is further provided with a process of performing a second detection mode capable of receiving an inform signal including the identification information, which is sent from each of the base station or stations conformed to the predetermined standard with a predetermined time interval, via the wireless communication device and capable of detecting the base station or stations existing within the communication area of the wireless communication device to be the object of access, on the basis of the received inform signal.

According to this aspect, it is possible to detect the base station or stations to be the object of access, on the basis of the inform signal sent from each of the base station or stations.

In another aspect of the present invention, the base station detection method is further provided with: a reference information update process of updating the reference information, on the basis of at least one of detection results of the process of performing the first detection mode and the process of performing the second detection mode.

According to this aspect, since the reference information is updated on the basis of at least one of the detection results of the first detection mode and the second detection mode, the efficient detection can be achieved.

In another aspect of the present invention, the base station detection method is further provided with: a process of performing, on the basis of the reference information, a third detection mode capable of sending a second detection signal, whose object of detection is a specific base station or stations among the all base stations by specifying the identification information, via the wireless communication device and capable of detecting whether or not the specific base station or stations exist within the communication area of the wireless communication device, on the basis of the response signal, which is transmitted in response to the second detection signal from each of the specific base station or stations.

According to this aspect, since the detection in the third detection mode is performed, on the basis of the reference information, the efficient detection can be achieved.

In an aspect of the present invention, the process of performing the third detection mode is performed only for one or more base stations set to be irresponsive to the first detection signal, in accordance with the reference information.

According to this aspect, since the detection in the third detection mode is performed only for the one or more base stations, which are set to be irresponsive to the first detection signal, in accordance with the reference information, the efficient base station can be achieved.

In this aspect, the process of performing the third detection mode may be performed for a part of the one or more base stations set to be irresponsive to the first detection signal.

In order to reduce the time required for a batch of base station detection, for a first occasion of the base station detection, the third detection mode may be performed for a part of the base stations set to be irresponsive to the first detection signal in accordance with the reference information for example, and for a next occasion of the base station detection, the third detection mode may be performed for another part of the base stations set to be irresponsive to the first detection signal. Performing detections in this manner makes it possible to reduce the time required for a batch of detection process.

As discussed above, according to the wireless communication apparatuses of the invention, since there are provided with the memory device and the base station detection device, it is possible to perform the base station detection efficiently. According to the base station detection method, since there are provided with the memory process and the process of performing the first detection mode, the efficient detection can be achieved.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Now, embodiments of the present invention are explained, with reference to drawings.

<A: Structure of Wireless Communication System 100>

Figure 1:
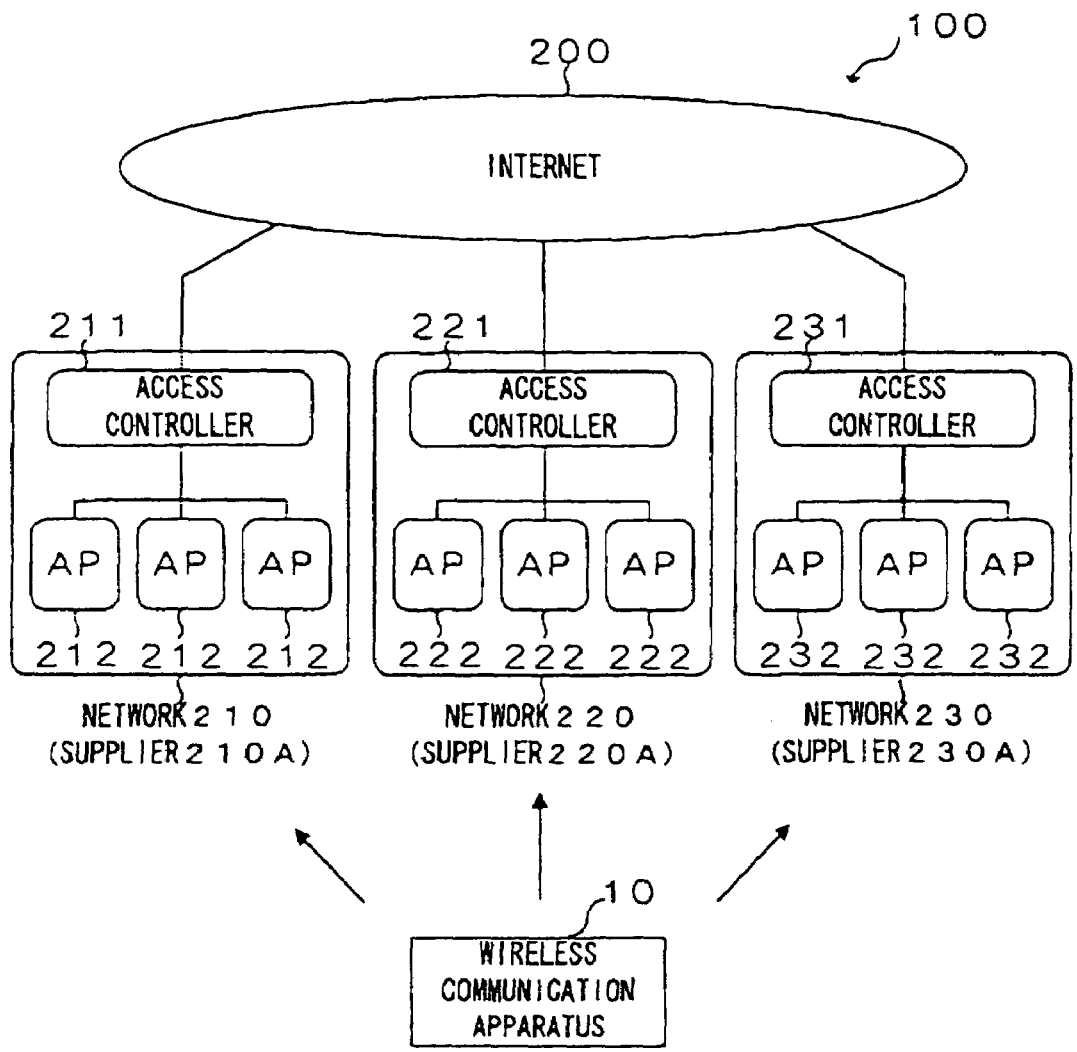
FIG. 1 is a conceptual diagram showing a wireless communication system in an embodiment of the present invention.

Firstly, an explanation is made on an installment environment of the wireless communication system according to an embodiment of the present invention, with reference to FIG. 1. FIG. 1 conceptually shows a communication system 100.

In FIG. 1, the communication system 100 is provided with: Internet 200; a network 210; a network 220; a network 230; and a wireless communication apparatus 10.

The networks 210, 220 and 230 are networks which may be managed on the basis of a public internet connection service such as Hotspot®, and connected to the Internet 200 via a wired communication using a telephone line, an ADSL line, an optical fiber cable or the like. The networks 210, 220 and 230 are managed by different suppliers 210A, 220A and 230A, respectively, and are opened only to wireless communication apparatuses permitted of their use by each supplier. The wireless communication apparatuses permitted of their use are connectable to the Internet 200 via these networks.

Now, an explanation is made on the network 210.

The network 210 is provided with: an access controller 211; and a plurality of AP's (Access Points) 212.

The access controller 211 authenticates wireless communication apparatuses which require connections, and performs an access control between these wireless communication apparatuses and the Internet 200.

The APs 212, which are examples of "base stations" according to the present invention, are access points disposed in conformity to a wireless LAN system defined by "IEEE (Institute of Electrical and Electronics Engineers) 802.11b" as an example of the "predetermined standard" according to the present invention. The APs 212 may be disposed at franchise restaurants, hotel lobbies, station buildings or the like, depending on a management form of the supplier 210A. Devices, which try to access the network 210, access APs 212 in accordance with the wireless LAN system according to the embodiment.

Incidentally, similarly to the network 210, the networks 220 and 230 are provided with: access controllers 221 and 231; and APs 222 and 232, respectively.

Incidentally, the "predetermined standard" according to the present invention is not limited to the aforementioned IEEE802.11b, but may be IEEE802.11a or IEEE802.11g. Furthermore, the forms of the networks 210, 220 and 230 are not limited to networks constructed on the basis of the public Internet connection service. For example, they may be networks constructed in local areas such as inside of an office or a home (e.g., LAN). Furthermore, they are not necessarily connected to the Internet 200. That is, the "base station" according to the present invention is not limited to an access point used for such a commercial Internet connection service, but may be an access point allowing an access to a network constructed in a local area such as inside of an office or a home.

Back to FIG. 1, the wireless communication apparatus 10, which is an example of the "wireless communication apparatus" according to the present invention, may be a personal computer provided with a wireless LAN card. The wireless communication apparatus 10 is permitted to access the networks 210, 220 and 230 by the suppliers 210A, 220A and 230A, respectively. That is, the APs 212, the APs 222 and the APs 232 are examples of the "base stations to be access objects" respectively according to the present invention.

Incidentally, the wireless communication apparatus 10 is not limited to a personal computer, but may be a PDA (Personal Digital Assistance), a cell phone, a portable AV (Audio Video) viewer player, a car navigation system, a car multimedia system and others, insofar as it is connectable to a network via a wireless LAN system.

<B: Structure of Wireless Communication Apparatus 10>

Figure 2:
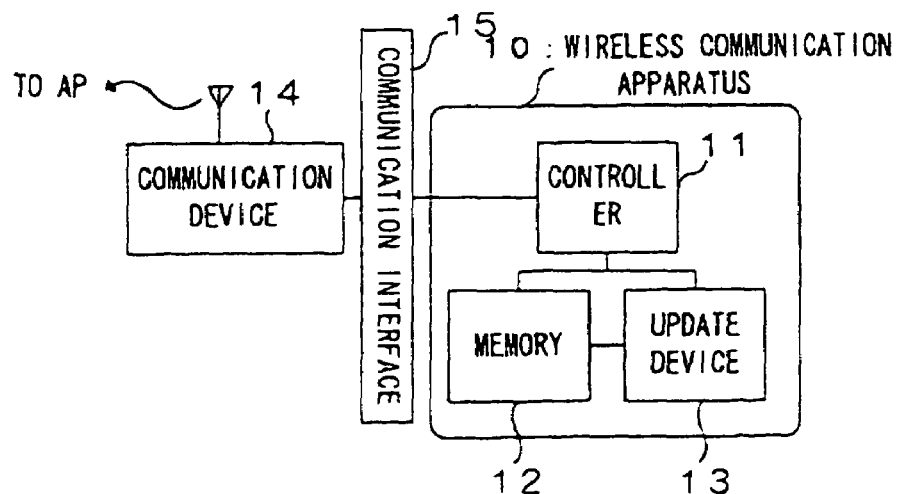
FIG. 2 is a block diagram showing a wireless communication apparatus in an embodiment of the present invention.

Now, an explanation is made on the wireless communication apparatus 10, with reference to FIG. 2. FIG. 2 shows the wireless communication apparatus 10 in a block diagram.

In FIG. 2, the wireless communication apparatus 10 is provided with: a controller 11; a memory 12; and an update device 13.

The controller 11, which may be provided with a CPU (Central Processing Unit) or the like, controls operation of the wireless communication apparatus 10.

The memory 12, which may be a re-writable record medium such as a RAM (Random Access Memory) or an HDD (Hard Disk Drive), records the ANY scan responsive flags, which are describe later, or the like of the APs 212, 222 and 232 to be access objects. Furthermore, the update device 13 is an example of the "reference information update device" according to the present invention for updating as appropriate the ANY scan responsive flags recorded into the memory 12, under control of the controller 11.

Furthermore, a communication device 14 and a communication interface 15 are connected to the wireless communication apparatus 10. The communication device 14 is an example of the "wireless communication device" according to the present invention allowing the wireless communication apparatus for making an access to at least one access point as an access object, in the wireless LAIN system of this embodiment. The communication device 14 may be embodied in a wireless LAN card or the like, in the case that the wireless communication apparatus 10 is a personal computer. The communication interface 15 is an interface between the communication device 14 and the wireless communication apparatus 10. Incidentally, the communication device 14 may be attached externally to the wireless communication apparatus 10, or may be built in the wireless communication apparatus 10 as a part thereof from the first. For example, it may be the wireless LAN card of this embodiment in the former case, and it may be a transceiver such as a cell phone in the latter case. That is, the "wireless communication apparatus" according to the present invention is representative of a concept generically referring to machines, devices or apparatuses allowing a wireless LAN connection finally with at least one base station of the invention, including various forms such as a form of self-provided or built-in wireless communication apparatus and a form allowing the communication with at least one base station through some functional expansion.

In such a structure, the communication device 14 transmits and receives radio waves based on the wireless LAN system of the embodiment, under control of the controller 11, so that the communication apparatus 10 is connected to the APs 212, 222 and 232 in conformity to the wireless LAN system. Furthermore, the controller 11 of the wireless communication apparatus 10 acts as an example of the "base station detection device" according to the present invention, for controlling the communication device 14 with a predetermined timing interval or designated timing to detect whether or not there is any access point around the wireless communication apparatus 10 accessible via the communication device 14.

<C: Structure of Connection Setting Database>

Figure 3:
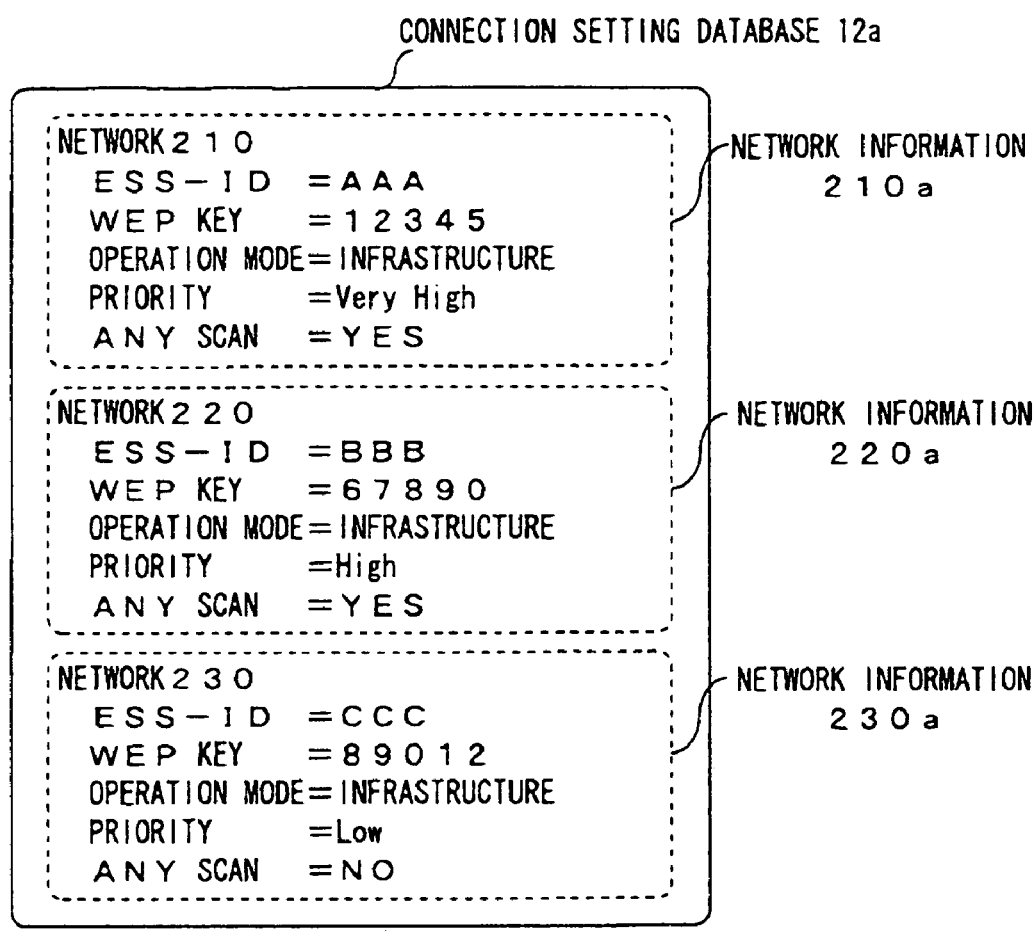
FIG. 3 is a schematic diagram showing a connection DB of the wireless communication apparatus in the embodiment.

In the wireless communication apparatus 10, the memory 12 stores network information necessary for the wireless LAN connection with the APs 212, 222 and 232 to be access objects. This network information is stored at the connection setting database (hereinafter referred to as a "connection DB" as appropriate) 12a within the memory 12. Now, an explanation is made on a detail of the connection DB 12a, with reference to FIG. 3. FIG. 3 schematically shows the connection DB 12a.

In FIG. 3, the connection DB 12a stores therein network informations 210a, 220a and 230a corresponding to the APs 212, 222 and 230 to be access objects, respectively.

Now, an explanation is made on the network information, with reference to the network information 210a.

The network information 210a includes therein five items: "ESS-ID"; "WEP key", "operation mode"; "priority"; and "ANY scan responsive flag".

The item "ESS-ID (Extended Service Set IDentification)", which is an example of the "identification information" according to the present invention, is identification information individually defined for each AP 212 on the basis of a wireless LAN standard of the embodiment. The ESS-ID is typically common for each supplier (i.e., each supplier has a unique ESS-ID, respectively). Therefore, the identification information to identify the APs 212 semantically equals to the identification information to identify the network 210. In this embodiment, an ESS-ID, "AAA" is assigned to the APs 212.

The item "WEP (Wired Equivalent Privacy) key" is a cryptography or encryption key for a wireless LAN connection from the wireless communication apparatus 10 to the APs 212. A value "12345" is assigned to the WEP key, in this embodiment. The WEP key and the aforementioned ESS-ID are informed or disclosed in some form in advance from the supplier 210A. In order to make an access to access points to be access objects via the wireless LAN connection, these two informations are required.

The item "operation mode" is information to indicate a connection mode for the wireless LAN connection. An infrastructure mode is set as the operation mode, in this embodiment. The infrastructure mode means a mode of the wireless LAN connection involving the intervention of access points, defined by the wireless LAN standard in this embodiment.

The item "priority" is information to define an access priority in the case that a plurality of accessible access points are detected. For example, the priority "Very High", which indicates a top priority, is assigned to the AP 212.

The item "ANY scan responsive flag", which is an example of the "reference information" according to the present invention, is information to indicate whether or not the APs 212 are the access point responsive to "ANY scan" mentioned below. The controller 11 judges the access points, where the ANY scan responsive flag is "YES", to be the access points responsive to the ANY scan, and judges the access points, where the ANY scan responsive flag is "NO", to be the access points irresponsive to the ANY scan.

The connection DB 12a stores therein the above mentioned network information for all access points to be access objects. If the number of access points to be the access objects is increased in any form, the network information corresponding to the added access point or points is registered in the connection DB 12a.

<D: Outline of Access Point Detection>

Figure 4:
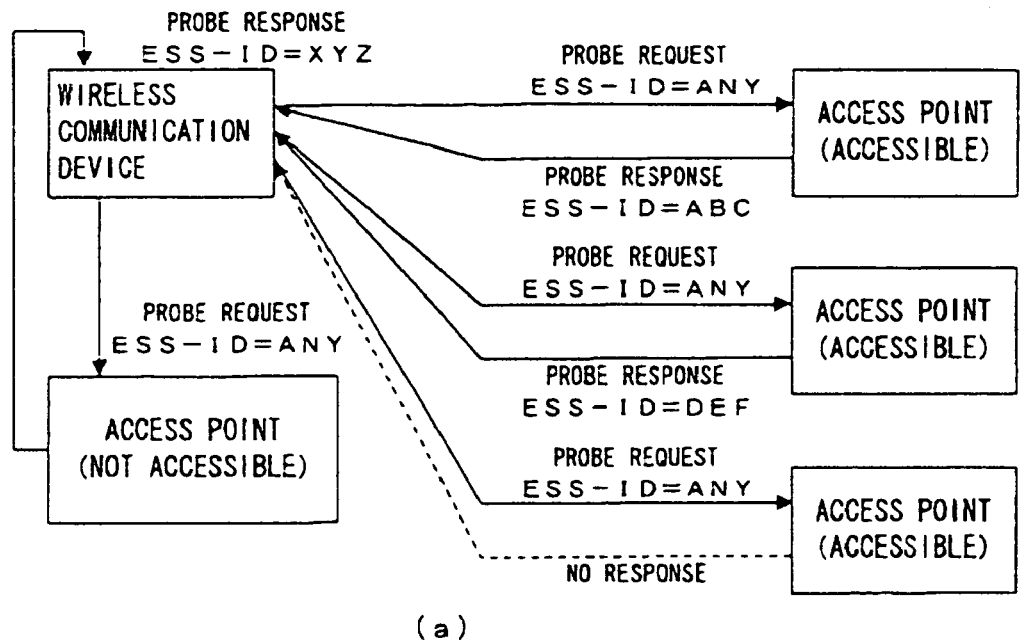
FIG. 4 is a conceptual diagram showing an AP detection process with the wireless communication apparatus in the embodiment.
Figure 4:
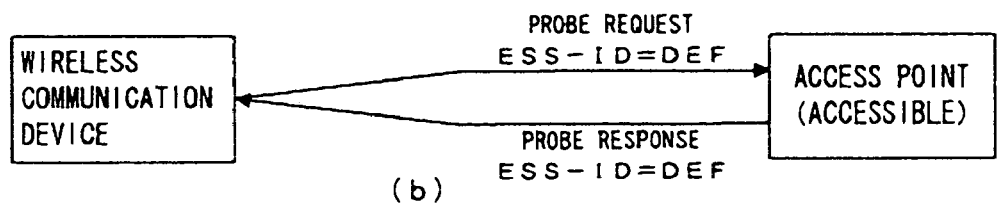
Figure 4:
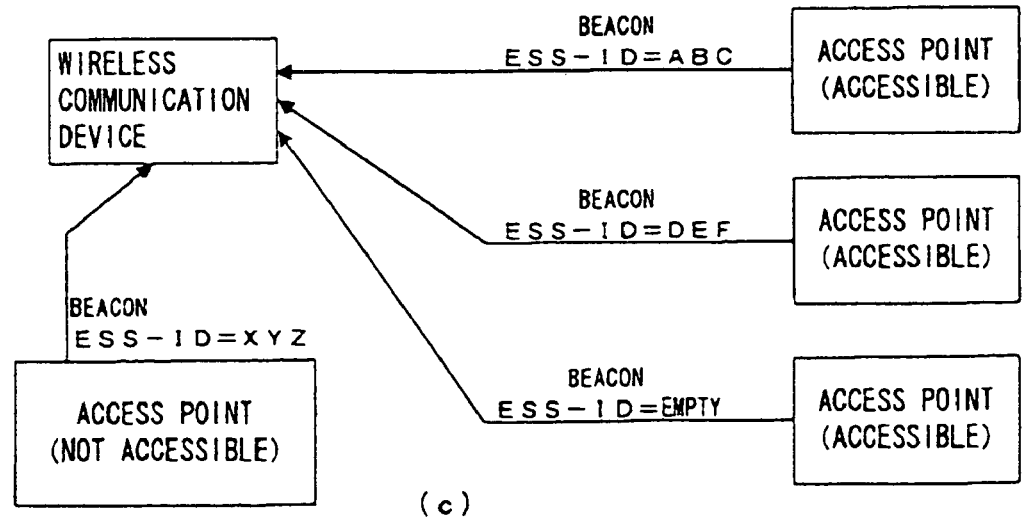

In the case that the wireless communication apparatus 10 is connecting to any access point via the wireless LAN connection while moving, there is a need for quickly detecting another available access point around a communication critical area of the presently accessed access point. In the wireless communication apparatus 10, the controller 11 performs an access point detection process (hereinafter refer to as "AP detection process") to detect an access point with a predetermined time interval. Now, an explanation is made on an outline of the AP detection process in this embodiment, with reference to FIG. 4. FIG. 4 conceptually shows an AP scan mode. For the simplicity of the drawing, a reference number for the wireless communication apparatus is omitted in FIG. 4, but the wireless communication apparatus shown in FIG. 4 equals to the wireless communication apparatus 10 shown in FIG. 2.

In FIG. 4, the wireless communication apparatus 10 has three types of AP scan modes. That is, these are an ANY scan mode (FIG. 4(a)), a special scan mode (FIG. 4(b)) and a passive scan mode (FIG. 4(c)).

In FIG. 4(a), the controller 11 sends a probe request, which is a packet for detecting an access point, via the communication device 14. This probe request includes the aforementioned ESS-ID as an information component. In the ANY scan mode, a probe request is sent in which the value "ANY" (equals to a broadcast SS-ID having the ESS-ID "0") is designated as the ESS-ID in common to all access points conformed to the wireless LAN standard in this embodiment. This probe request in which the "ANY" is designated as the ESS-ID is an example of the "first detection signal" according to the present invention. That is, this ANY scan mode is an example of the "first detection mode" according to the present invention.

The probe request sent in the ANY scan mode reaches all the networks which exist within a communication area (i.e., a range in which the communication is enabled) of the communication device 14 and which conform to the wireless LAN standard in this embodiment. The network which has received this probe request returns a packet referred to as a "probe response". This probe response is an example of the "response signal" according to the present invention, including the ESS-ID. The controller 11 detects whether or not the access point exists, on the basis of this probe response.

Basically, in this ANY scan mode, all the access points existing within the communication area of the wireless communication apparatus 10 are detectable. Nevertheless, some access points do not return any probe response to the probe request in this ANY scan mode, because of the security concern or the like. Such access points are examples of the aforementioned "access points irresponsive to the ANY scan". Therefore, the probe response is sent only from the access point responsive to the ANY scan. That is, this access point responsive to the ANY scan is an example of the access point which is "set to be responsive to the first detection signal". Information to indicate the responsibility or irresponsibility to the ANY scan is the "ANY scan responsive flag" mentioned above. In this embodiment, the responsibility or irresponsibility to the ANY scan is determined for each of the suppliers.

Furthermore, an access point from which the probe response is returned in response to the probe request in the ANY scan mode is not limited to an access point to be an access object. Even if it is an access point other than the access point to be the access object, it may return a probe response to the wireless communication apparatus 10, insofar as it is an access point responsive to the ANY scan. In this case, since the network information about this access point is not recorded in the connection DB 12a as shown in FIG. 3 of the wireless communication apparatus 10, the controller 11 does not recognize this access point as the accessible access point.

In FIG. 4(b), the wireless communication apparatus 10 sends a probe request in which the access point is specified, when performing the special scan mode. This probe request is sent as a packet for which an ESS-ID of a special access point is designated as the ESS-ID. That is, the probe request in the special scan mode is an example of the "second detection signal" according to the present invention, and the special scan mode is an example of the "third detection mode" according to the present invention. The access point designated by this probe request returns a probe response including the ESS-ID, similarly to the case of the ANY scan mode.

Incidentally, each of the ANY scan mode and the special scan mode is referred to as an "active scan", because they scan access points by sending probe requests, which are detection signals to detect access points, from the wireless communication apparatus 10.

In FIG. 4(c), a passive scan mode is depicted. Each access point sends a beacon, which is a signal including an ESS-ID, with a predetermined time interval, regardless of whether or not the probe request exists. The passive scan mode is an example of the "second detection mode" according to the present invention, in which the wireless communication apparatus 10 receives this beacon and thereby perform the AP scan. That is, the beacon is an example of the "inform signal" according to the present invention.

Incidentally, the beacon including the ESS-ID is sent only from the access point responsive to the ANY scan. The beacon having no ESS-ID information component is sent from the access point irresponsive to the ANY scan. Therefore, the access point detectable by this passive scan equals to the access point responsive to the ANY scan.

<E: Detail of AP Detection Process>

Figure 5:
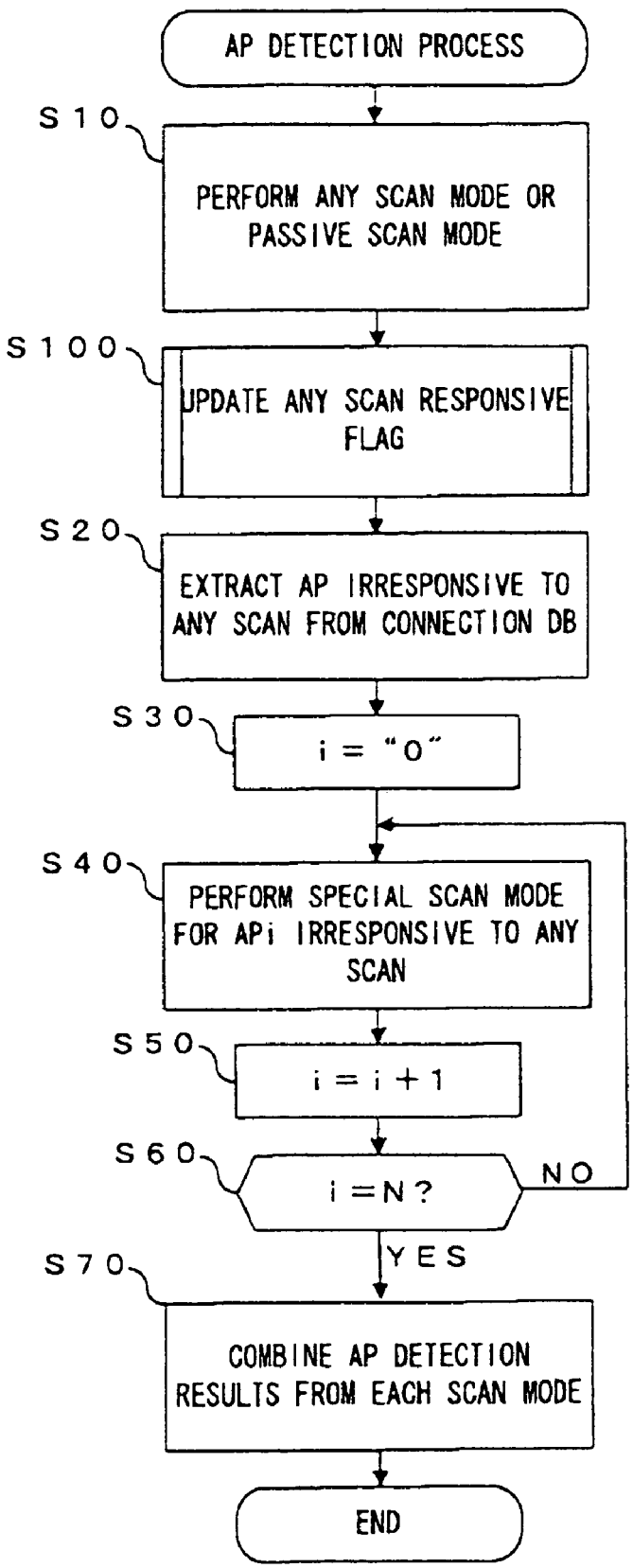
FIG. 5 is a flow chart showing an operational flow of the AP detection process in the embodiment.

Now, an explanation is made on a detail of the AP detection process with the wireless communication apparatus 10, with reference to FIG. 5. FIG. 5 is a flow chart showing the AP detection process. Incidentally, the wireless communication apparatus 10 is used at a position where all kinds of the APs 212, 222 and 232 exist within the communication area of the communication device 14.

In FIG. 5, the controller 11 firstly performs the ANY scan mode or the passive scan mode (step S10). As mentioned above, since the access points detected in the ANY scan mode equal to those in the passive scan mode, the AP scan may be performed in either one of these two modes. The access points detected at the step S10 are temporarily stored into the memory 12, in association with each ESS-ID. Incidentally, the step S10 is an example of "a process of performing a first detection mode" or "a process of performing a second detection mode" according to the present invention.

Once the AP scan is performed in either mode at the step S10, the controller 11 performs an ANY scan responsive flag update process of updating the ANY scan responsive flag in the connection DB 12a (step S100). Incidentally, a detail of this ANY scan responsive flag update process is mentioned later.

Then, the controller 11 refers to the ANY scan responsive flag recorded into the connection DB 12a and extracts the access points irresponsive to the ANY scan (step S20). As a result, it is assumed that "N" pieces of APi (i=0, 1, . . . N−1) which are irresponsive to the ANY scan are extracted. Incidentally, in this embodiment, since the access points which are irresponsive to the ANY scan are only the APs 232, N is "1", while the APs 232 are managed as $AP_0s$.

Then, the controller 11 sets the counter "i" to "0" (step S30), and performs the special scan mode with respect to the APis (step S40). That is, in this embodiment, the special scan is performed in which "CCC" is designated as the ESS-ID. The access points detected by this special scan are temporarily stored in the memory 12, in association with each ESS-ID. Incidentally, the step S40 is an example of "a process of performing a third detection mode" according to the present invention.

Then, the controller 11 increments the counter "i" by "1" (step S50), and judges whether or not the counter "i" is equal to "N", i. e. whether or not the special scan is performed for all of total N pieces of access points which are irresponsive to the ANY scan (step S60). If the judgment result at the step S60 is "No", the controller 11 gets the process back to the step S40 to repeat the step S40 to the step S60 as many as the number of access points which are irresponsive to the ANY scan. If the judgment result at the step S60 is "Yes", the access point detection results at the step S10 and the step S40, which are temporarily stored in the memory 12, are combined, so that all access points are detected which are presently accessible (step 70). Thus, the AP detection process ends.

<F: Detail of ANY Scan Responsive Flag Update Process>

Figure 6:
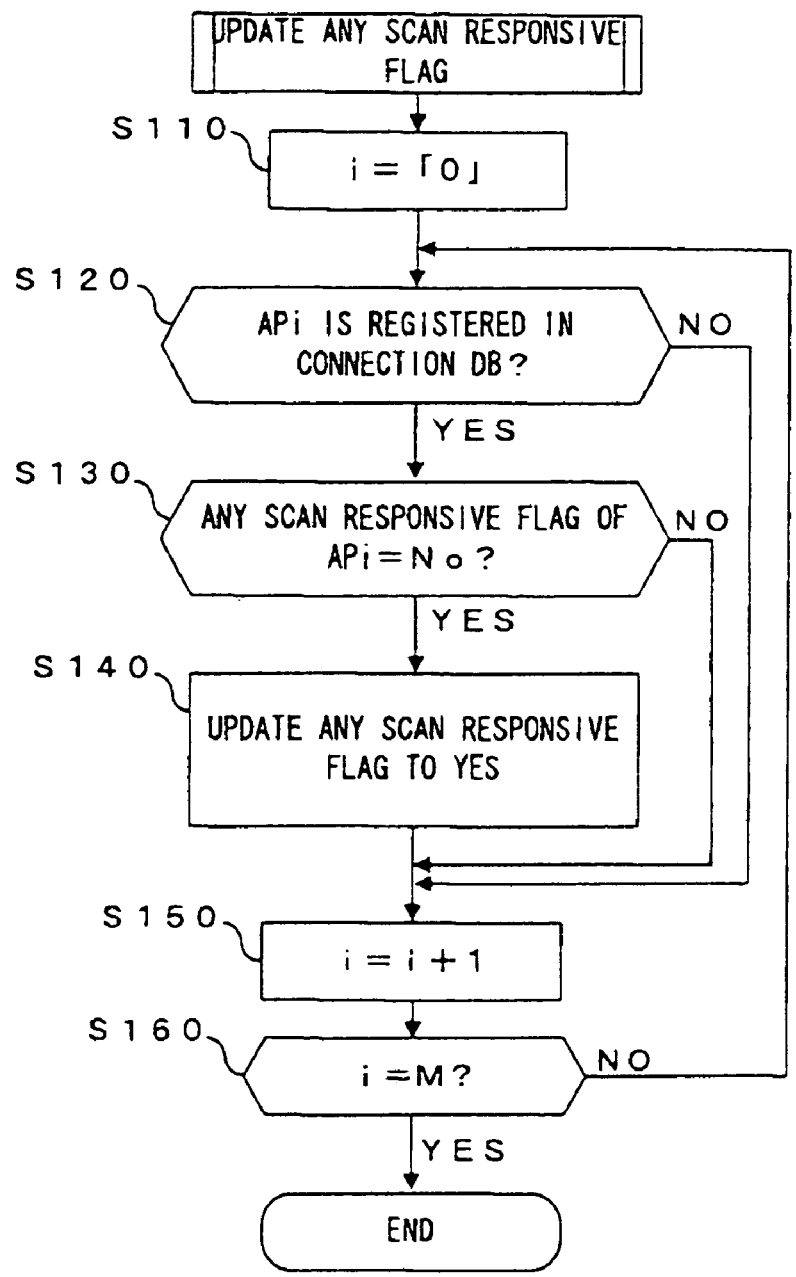
FIG. 6 is a flow chart showing an operational flow of a process of updating an ANY scan responsive flag in the AP detection process in the embodiment.

Now, an explanation is made on the ANY scan responsive flag update process shown as the step S100 in the AP detection process of FIG. 5, with reference to FIG. 6. FIG. 6 is a flow chart showing the ANY scan responsive flag update process. Incidentally, the ANY scan responsive flag update process is an example of the "reference information update process" according to the present invention.

In FIG. 6, the controller 11 firstly makes the counter "i" to "0" (step S110). Incidentally, it is assumed that the total number of access points detected in the ANY scan mode or the passive scan mode at the step S10 in the aforementioned AP detection process is "M". Furthermore, it is assumed that M pieces of APi (i=0, 1, . . . , M−1) include therein APs 212 and 222 which are responsive to the ANY scan at the connection DB 12a.

Then, the controller 11 judges whether or not the network information of APi is recorded in the connection DB 12a (step S120). If the APi is an access point which is not recorded in the connection DB 12a (step S120: No), the controller 11 judges that this access point is not an access object and shifts the process to a step S150. Along with this, the controller 11 deletes from the memory 12 the information about this access point which is not judged as the access object.

If the APi is an access point that is recorded in the connection DB 12a (step S120: Yes), the controller 11 judges whether or not the ANY scan responsive flag of this APi is "No", i.e. whether or not the APi is an access point which are irresponsive to the ANY scan (step S130).

If the APi is responsive to the ANY scan (step S130: No), the controller 11 shifts the process to the step S150. On the other hand, if the APi is irresponsive to the ANY scan (step S130: Yes), the controller 11 controls the update device 13 to update the ANY scan responsive flag of the APi to "Yes" (step S140).

Once the step S140 is executed, the counter "i" is incremented by "1" (step S150). Then, a judgement is made on whether or not the counter "i" is "M", i.e. whether or not the process of updating the ANY scan responsive flag is performed for all of total M pieces of access points detected by the ANY scan or passive scan (step S160).

If the access point for which the process is not yet performed exists (step S160: No), the controller 11 gets the process back to the step S120 to repeat the processes from the step S120 to the step S150. If the process is performed for all detected access points (step S160: Yes), the process of updating the ANY scan responsive flag ends.

In the above description, since the ANY scan responsive flag judges that the APs 212 and 222 are the access points responsive to the ANY scan, the ANY scan responsive flag is not updated. However, the ANY scan responsive flag recorded in the connection DB 12a does not originally, exactly and actually describe its responsibility or irresponsibility to the ANY scan. This ANY scan responsive flag is just the reference information for the controller 11 to judge whether or not a detected access point is responsive to the ANY scan. Therefore, for example, the controller 11 may assign "No" to all ANY scan responsive flags by default or as the initial values via the update device 13. In this case, since some access points, which are irresponsive to the ANY scan, may be detected by performing the ANY scan mode or passive scan mode, the ANY scan responsive flag is updated. In this manner, in the case that all initial values of ANY scan responsive flags are set to "No", any mis-detection of access points can be avoided, resulting in a reliable detection of access points.

As described above, the process of detecting APs in this embodiment makes it possible to record the ANY scan responsive flags and update these flags, so that an useless special scan is prevented from occurring, resulting in an efficient detection of access points.

Incidentally, since the situation that the ANY scan responsive flag is "Yes" but irresponsive to the ANY scan hardly happens, the reliability for the detection of access points is sufficiently ensured in the detection of APs in this embodiment.

Furthermore, the network information in the connection DB 12a may be updated by an operation device provided for the wireless communication apparatus 10, such as a keyboard, at any desired timing.

Figure 7:
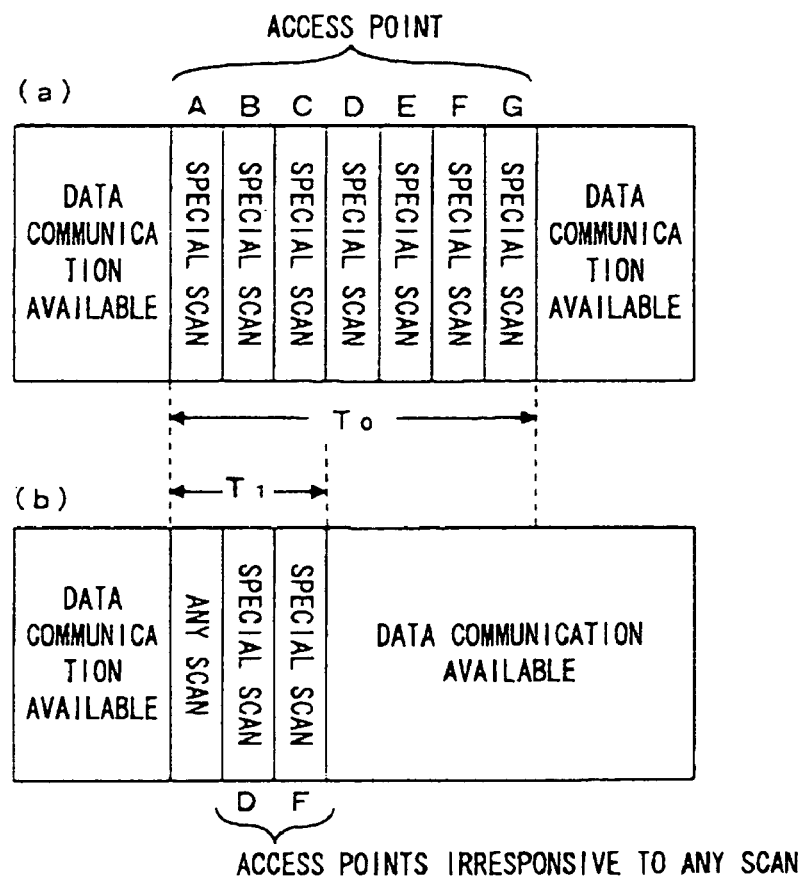
FIG. 7 is a diagram for a comparison between the AP detection process in the embodiment of the present invention and another AP detection process in a comparative example.

Since the wireless communication apparatus 10 in this embodiment records the ANY scan responsive flags at the connection DB 12a, the detection process of the APs can be performed efficiently. Now, an explanation is made on the effect of detecting the APs in this embodiment, with reference to FIG. 7. In FIG. 7, a comparison is made between the AP detection process of this embodiment and another AP detection process of a comparative example. For the clear understanding of the effect of this embodiment, however, the total number of access points to be access objects is different from that in the above description.

Namely, in FIG. 7, access points A, B, C, D, E, F and G are access points to be access objects, and access points D and F are irresponsive to the ANY scan. Furthermore, in FIG. 7(a) is representative of the AP detection process in the comparative example, and FIG. 7(b) is representative of the AP detection process in this embodiment.

Incidentally, FIG. 7 show such a situation that the AP detection process is performed, while the wireless communication apparatus is connected to any access point to establish a data communication with a wide area network such as Internet.

In FIG. 7(a), since it is not possible to judge whether or not the access points to be access objects are responsive to the ANY scan mode, the special scan mode is performed sequentially for all seven access points. It is assumed that the AP detection process in this comparative example requires time $T_0$.

In FIG. 7(b), the ANY scan mode is firstly performed. It is assumed that this ANY scan mode detects the access points A and E only, and does not detect the access points B, C, D, F or G. In this embodiment, however, the access points B, C and G are already judged as responsive to the ANY scan by the ANY scan responsive flags recorded in the connection DB 12a. It is therefore obvious that these three access points are out of the communication area of the communication device 14. Therefore, the special scan is performed for the access points D and F only. Consequently, the AP detection process requires time $T_1$ ($T_1 < T_0$).

Thus, as apparent from the comparative example, since the wireless communication apparatus 10 in this embodiment records the ANY scan responsive flags at the connection DB 12a, it can perform the access point detection very efficiently. For example, in the IEEE802.11b standard of this embodiment, fourteen communication channels are defined with frequency zones around 2.4 GHz. Because it is unknown that each access point uses which frequency zone, each scan requires the scan time for fourteen channels, regardless of whether it is the ANY scan or the special scan. Therefore, the effect of reducing the number of special scans is very great. That is, such an efficient AP detection makes it possible to remarkably reduce the risk of disturbing the data communication with the presently connected network, and avoid the reduction in the time average data transfer rate (throughput). Therefore, for example, it is possible to perform an image streaming or the like comfortably with the wireless communication apparatus 10, while continuously moving.

Incidentally, in the case that access points detected in the ANY scan mode or passive scan mode of the AP detection process include access points which are not access objects, the controller 11 may records the identification information of the latter at the memory 12. In this manner, if these access points become newly access points, these points can be instantly identified as responsive to the ANY scan, so that time required for the AP detection process can be prevented from increasing due to the useless special scan.

Incidentally, the wireless communication apparatus 10 in this embodiment may be provided with an ad hoc mode to communicate directly with other client devices connected to the LAN, without the intervention of these access points.

MODIFIED EXAMPLES

Figure 8:
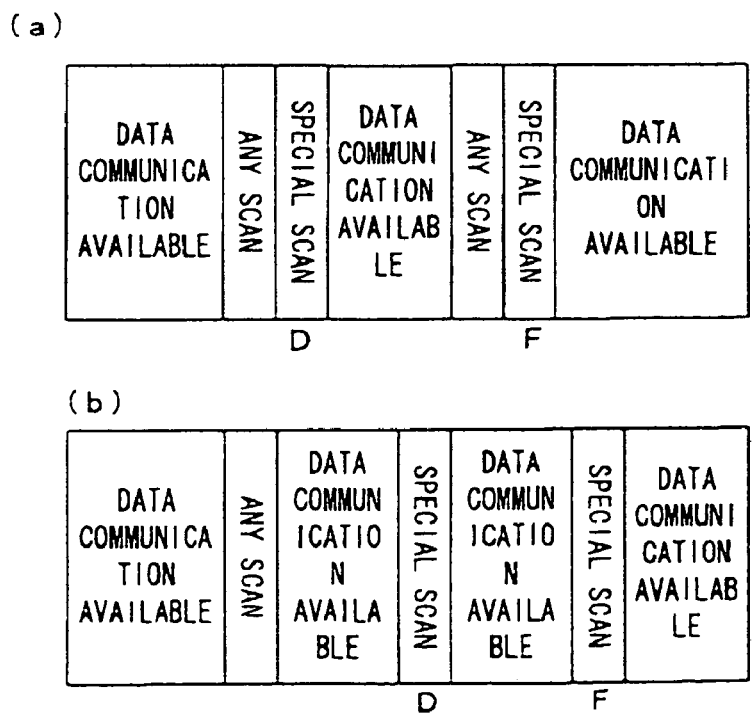
FIG. 8 is a conceptual diagram showing a modified example of the embodiment of the present invention.

The embodiment of the AP detection process is not limited to this embodiment, but may take various forms. Now, an explanation is made on the modified example of the AP detection process according to the present invention, with reference to FIG. 8. FIG. 8 conceptually show the modified example of the AP detection process according to the present invention. Incidentally, FIG. 8 are representative of the modified example based on the AP detection process shown in FIG. 7(b). Therefore, the same components as those of FIG. 7 carry the same numerals, which are omitted in their explanation.

In FIG. 8, the AP detection process may be performed such that a ratio of the performance of the special scan with respect to that of the ANY scan is 1:1 (FIG. 8(a)). That is, a pair of one ANY scan and one special scan with respect to the access point D may be performed, and another pair of one ANY scan and one special scan with respect to the access point F may be performed at the later detection. Performing the AP detection process in such a manner makes it possible to reduce time required for one AP detection, even though the number of scans relative to a certain access point or points is reduced.

Furthermore, the AP detection process may be adapted to perform the ANY scan, the special scan for the access point D and the special scan for the access point F, independently of each other in their execution timings (FIG. 8(b)). Such an AP detection process makes it possible to reduce the time required for one batch of the AP detection process.

The invention may be embodied in other specific forms without departing from the spirit or essential characteristics thereof The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-099176 filed on Mar. 30, 2004 including the specification, claims, drawings and summary is incorporated herein by reference in its entirety.

What is claimed is:

1. A wireless communication apparatus capable of establishing a wireless communication conformed to a predetermined standard with a base station or stations conformed to the predetermined standard via a wireless communication device, said apparatus comprising:

a memory device for storing identification information individually assigned to each of the base station or stations in conformity to the predetermined standard, in association with each of the base station or stations to be an object of access; and a base station detection device having a first detection mode capable of sending via said wireless communication device a first detection signal, whose object of detection is all base stations conformed to the predetermined standard, without specifying the identification information, and capable of detecting the base station or stations existing within a communication area of said wireless communication device to be the object of access, on the basis of a response signal, which is transmitted in response to the first detection signal from each of the base station or stations set to be responsive to the first detection signal among the all base stations and includes the identification information, wherein said memory device further stores, in association with the identification information, reference information to indicate whether or not each of the base station or stations to be the object of access is a base station set to be responsive to the first detection signal.

2. The wireless communication apparatus according to claim 1, wherein
said apparatus comprises said wireless communication device.

3. The wireless communication apparatus according to claim 1, wherein
said base station detection device further has a second detection mode ca able of receiving an inform signal including the identification information, which is sent from each of the base station or stations conformed to the predetermined standard with a predetermined time interval, via said wireless communication device and capable of detecting the base station or stations existing within the communication area of said wireless communication device to be the object of access, on the basis of the received inform signal.

4. The wireless communication apparatus according to claim 1, wherein
said base station detection device further has a third detection mode capable of sending a second detection signal, whose object of detection is a specific base station or stations among the all base stations by specifying the identification information, via said wireless communication device and capable of detecting whether or not the specific base station or stations exist within the communication area of said wireless communication device, on the basis of the response signal, which is transmitted in response to the second detection signal from, each of the specific base station or stations.

5. The wireless communication apparatus according to claim 1, wherein
said memory device stores the reference information such that the reference information can be updated.

6. The wireless communication apparatus according to claim 3, further comprising a reference information update device for updating the reference information stored in said memory device, on the basis of at least one of detection results of the first detection mode and the second detection mode.

7. The wireless communication apparatus according to claim 4, wherein
said base station detection device further has a second detection mode capable of receiving an inform signal including the identification information, which is sent from each of the base station or stations conformed to the predetermined standard with a predetermined time interval, via said wireless communication device and capable of detecting the base station or stations existing within the communication area of said wireless communication device to be the object of access, on the basis of the received inform signal, and said base station detection device performs the first or second detection mode, and the third detection mode for a batch of base station detection, the third detection mode being for specifying at least a part of the base stations set to be non-responsive to the first detection signal from among the base station or stations to be the object of access.

8. The wireless communication apparatus according to claim 4, wherein
said base station detection device further has a second detection mode capable of receiving an inform signal including the identification information, which is sent from each of the base station or stations conformed to the predetermined standard with a predetermined time interval, via said wireless communication device and capable of detecting the base station or stations existing within the communication area of said wireless communication device to be the object of access, on the basis of the received inform signal, and said base station detection device selectively performs either one of the first detection mode, the second detection mode and the third detection mode for a batch of base station detection, the third detection mode being for specifying at least a part of the base stations set to be non-responsive to the first detection signal from among the base station or stations to be the object of access.

9. A base station detection method on a wireless communication apparatus capable of establishing a wireless communication conformed to a predetermined standard with a base station or stations conformed to the predetermined standard via a wireless communication device, said method comprising:

a memory process of storing identification information individually assigned to each of the base station or stations in conformity to the predetermined standard, in association with each of the base. station or stations to be an object of access; and a base station detection process having a first detection mode capable of sending via said wireless communication device a first detection signal, whose object of detection is all base stations conformed to the predetermined standard, without specifying the identification information, and capable of detecting the base station or stations existing within a communication area of said wireless communication device to be the object of access, on the basis of a response signal, which is transmitted in response to the first detection signal from each of the base station or stations set to be responsive to the first detection signal among the all base stations and includes the identification information, wherein said memory process includes a process of storing, in association with the identification information, reference information to indicate whether or not each of the base station or stations to be the object of access is a base station set to be responsive to the first detection signal.

10. The base station detection method according to claim 9, further comprising:

a process of performing a second detection mode capable of receiving an inform signal including the identification information, which is sent from each of the base station or stations conformed to the predetermined standard with a predetermined time interval, via said wireless communication device and capable of detecting the base station or stations existing within the communication area of said wireless communication device to be the object of access, on the basis of the received inform signal.

11. The base station detection method according to claim 10, further comprising:
a reference information update process of updating the reference information, on the basis of at least one of detection results of said process of performing the first detection mode and said process of performing the second detection mode.

12. The base station detection method according to claim 9, further comprising:
a process of performing, on the basis of the reference information, a third detection mode capable of sending a second detection signal, whose object of detection is a specific base station or stations among the all base stations by specifying the identification information, via said wireless communication device and capable of detecting whether or not the specific base station or stations exist within the communication area of said wireless communication device, on the basis of the response signal, which is transmitted in response to the second detection signal from each of the specific base station or stations.

13. The base station detection method according to claim 12, wherein
said process of performing the third detection mode is performed only for one or more base stations set to be non-responsive to the first detection signal, in accordance with the reference information.

14. The base station detection method according to claim 13, wherein
said process of performing the third detection mode is performed for a part of said one or more base stations set to be non-responsive to the first detection signal.

15. A wireless communication apparatus comprising:
a memory storing identification information identifying one or more base stations; and
a controller for generating a first detection signal sent in common via a wireless communication device to all of the base stations and for detecting those ones of the base stations within communication range of the wireless communication apparatus on the basis of response signals received via the wireless communication device from those base stations,
wherein the memory further stores responsiveness information indicating whether each of the one or more base stations is set to be responsive or non-responsive to the first detection signal.

16. The wireless communication apparatus according to claim 15, wherein the controller generates second detection signals individually sent via the wireless communication device to only base stations from which no response signal is received and which am determined in accordance with the stored responsiveness information as being set to be non-responsive to the first detection signal.

17. The wireless communication apparatus according to claim 15, wherein the wireless communication device is integrated within the wireless communication apparatus.

18. A wireless communication apparatus comprising:
a memory storing identification information identifying one or more base stations; and
a controller for detecting those ones of the base stations within communication range of the wireless communication apparatus on the basis of inform signals periodically received via a wireless communication device from those base stations, the inform signals including first-type inform signals including base station identification information and second-type inform signals without base station identification information,
wherein the memory further stores inform-signal type information indicating whether each of the one or more base stations is set to send a first-type inform signal or a second-type inform signal.

19. The wireless communication apparatus according to claim 18, wherein the controller generates detection signals individually sent via the wireless communication device to only base stations from which no first-type inform signal is received and which are determined in accordance with the stored inform-signal type information as being set to send a second-type inform signal.

20. The wireless communication apparatus according to claim 18, wherein the wireless communication device is integrated within the wireless communication apparatus.

* * * * *